(12) United States Patent
Wu

(10) Patent No.: US 11,678,960 B2
(45) Date of Patent: Jun. 20, 2023

(54) DENTAL IMPLANT

(71) Applicant: TAIWAN NIPPON DENTAL ALLIANCE CO., LTD., Taipei (TW)

(72) Inventor: Wen-Yuen Wu, Taipei (TW)

(73) Assignee: TAIWAN NIPPON DENTAL ALLIANCE CO., LTD., Taipei (TW)

( * ) Notice: Subject to any disclaimer, the term of this patent is extended or adjusted under 35 U.S.C. 154(b) by 329 days.

(21) Appl. No.: 17/038,057

(22) Filed: Sep. 30, 2020

(65) Prior Publication Data

US 2021/0220092 A1 Jul. 22, 2021

(30) Foreign Application Priority Data

Jan. 17, 2020 (TW) ................................. 109101784
May 22, 2020 (TW) ................................. 109117246

(51) Int. Cl.
*A61C 8/00* (2006.01)
*A61C 13/225* (2006.01)

(52) U.S. Cl.
CPC .......... *A61C 8/0069* (2013.01); *A61C 8/0057* (2013.01); *A61C 13/225* (2013.01)

(58) Field of Classification Search
CPC ....... A61C 8/0069; A61C 8/057; A61C 8/005; A61C 8/0048; A61C 8/00; A61C 13/225; A61C 13/00
USPC ...................................... 433/173–176, 201.1
See application file for complete search history.

(56) References Cited

U.S. PATENT DOCUMENTS

| 4,488,875 | A | 12/1984 | Niznick |
| 4,744,754 | A | 5/1988 | Ross |
| 4,886,456 | A | 12/1989 | Ross |
| 5,417,570 | A | 5/1995 | Zuest et al. |
| 5,433,606 | A | 7/1995 | Niznick et al. |
| 6,261,097 | B1 | 7/2001 | Schmutz et al. |
| 9,730,771 | B2 | 8/2017 | Westover |
| 2010/0086900 | A1 | 4/2010 | Whipple |
| 2017/0239020 | A1* | 8/2017 | McDonald ........... A61C 8/0039 |
| 2017/0340416 | A1 | 11/2017 | Westover |

FOREIGN PATENT DOCUMENTS

| DE | 4112178 A1 | 10/1992 |
| DE | 102010060567 A1 | 5/2012 |
| JP | H07275266 A | 10/1995 |
| KR | 10-1673379 B1 | 11/2016 |
| WO | 9619947 A1 | 7/1996 |

(Continued)

*Primary Examiner* — Ralph A Lewis
*Assistant Examiner* — Mirayda A Aponte
(74) *Attorney, Agent, or Firm* — Mark M. Friedman

(57) ABSTRACT

A dental implant is provided, wherein the dental implant includes a dental root implant. The dental root implant forms a columnar body, and two ends thereof have a tubular portion and a joint portion, respectively, wherein the tubular portion is provided with a plurality of through holes. A central groove is formed inside the tubular portion and communicates with the through holes, wherein an inner diameter of the central groove tapers from approaching the joint portion to away from the joint portion. The joint portion can be coupled to a dental crown, and the tubular portion can be coupled to a human alveolar bone. The through holes can facilitate an osseointegration of the dental root implant in the alveolar bone.

9 Claims, 14 Drawing Sheets

(56) References Cited

FOREIGN PATENT DOCUMENTS

| WO | 2007073743 | | 7/2007 |
|----|------------|----|---------|
| WO | 2009137545 | A1 | 11/2009 |
| WO | 2010131879 | A2 | 11/2010 |

* cited by examiner

DENTAL IMPLANT

CROSS REFERENCE TO RELATED APPLICATIONS

This application claims the priority of Taiwan Patent Application No. 109101784, filed on Jan. 17, 2020, and the priority of Taiwan Patent Application No. 109117246, filed on May 22, 2020, the disclosure of which is incorporated herein by reference.

FIELD OF INVENTION

The present disclosure relates to an implant, and in particular, relates to a dental implant.

BACKGROUND OF INVENTION

When missing teeth in a human body are caused by tooth decay, tooth disease, or injury, dental implants have gradually replaced traditional dentures. Although dental implants have become the most common treatment option for restoration of missing teeth, the failure of dental implants is still heard.

There are many possible reasons to blame, such as infection, patient biting habits, poor oral hygiene, mechanical design, etc. The mechanical design problems may result from dentists or related operators, such as the lack of experience of doctors. Since the preoperative plan is not perfect, for example, implant selection, implant angles, directions, and positions are incorrect, the bone repair surgery is not well evaluated, bone material and wound treatment are not cautious enough, implant material quality is not high, and the prosthesis is not fit enough, etc, some troubles in long-term use may be caused.

At present, the mainstream dental implants mostly use threaded bolts to be directly locked in the alveolar bone. Many variables, such as shapes and sizes of threads, affect the success rate and service life of the dental implants.

Moreover, the outer surface of the threaded bolt is not flat, and there is a gap between the outer surface and the inner ring surface of the drill hole of the alveolar bone, and food residue and bacteria are prone to invade and cause infection.

Therefore, it is necessary to develop a non-threaded implant to eliminate the undesirable variables of the threaded implants and improve the success rate of the implant.

SUMMARY OF INVENTION

In order to improve the shortcomings of conventional technology, the present disclosure is to provide a non-bolt-type dental implant to avoid the problem of combining the bolt-type implant with the alveolar bone.

Another object of the present disclosure is to provide a dental implant that may be well integrated with the alveolar bone.

Another object of the present disclosure is to provide a dental implant, which makes a dental root implant and the dental crown combine well.

Another object of the present disclosure is to provide a dental implant, so that the dental root implant and the dental crown may be separated.

To achieve the above object, the present disclosure provides a dental implant, wherein the dental implant comprises a dental root implant forming a columnar body, wherein two ends of the columnar body have a tubular portion and a joint portion, respectively. The tubular portion is provided with a plurality of through holes, a central groove is formed inside the tubular portion and communicates with the through holes, and an inner diameter of the central groove tapers from approaching the joint portion to away from the joint portion. The joint portion may be combined with a dental crown, and the tubular portion may be combined with an alveolar bone. These through holes may promote the osseointegration of the dental root implant and the alveolar bone, thereby avoiding the problem of the combination of a bolt type implant and the alveolar bone.

In one embodiment, the dental implant further comprises a joint member, and the joint member includes a body and a plurality of elastic hooks. The elastic hooks are annularly arranged to connect one end of the body, a slot is formed between the adjacent elastic hooks, and each of the elastic hooks includes a top portion protruding outward. The joint portion is provided with a counterbore, an inner wall of the counterbore is provided with a coupling groove, and the top portions of the elastic hooks buckle the coupling groove.

In one embodiment, a wall is disposed between the counterbore and the tubular portion, and the wall may prevent an alveolar bone from entering the joint portion.

In one embodiment, the wall is provided with a driving hole to facilitate the combination with driving tools.

In one embodiment, an outer surface of the body is provided with an annular groove, which may be tightly integrated with the dental crown and other components and is not easily separated In one embodiment, the dental implant further includes a restraint ring, and an outer surface of the dental root implant and an outer surface of the joint member are sleeved with the restraint ring. The restraint ring is regarded as an outer sheath of the dental root implant and the joint portion, so that the the dental root implant and the joint portion do not swing radially.

In one embodiment, an outer surface of the restraint ring is provided with at least one flange, which may be tightly combined with the artificial dental crown and other components and is not easily separated.

In one embodiment, the dental root implant is provided with a protrusion, and the joint member is provided with a concave hole corresponding to the protrusion.

In one embodiment, the dental implant further includes a supporting member including a filling portion and a stopping portion, the joint member is provided with a through hole, the filling portion is coupled to the through hole, and the stopping portion is located inside the elastic hooks.

In one embodiment, a gap is formed between the stopping portion and each of the elastic hooks.

DETAILED DESCRIPTION OF PREFERRED EMBODIMENTS

The structure and the technical means adopted by the present disclosure to achieve the above and other objects can be best understood by referring to the following detailed description of the preferred embodiments and the accompanying drawings. Furthermore, directional terms described by the present disclosure, such as upper, lower, front, back, left, right, inner, outer, side, longitudinal/vertical, transverse/horizontal, etc., are only directions by referring to the accompanying drawings, and thus the used directional terms are used to describe and understand the present disclosure, but the present disclosure is not limited thereto.

Figure 1:
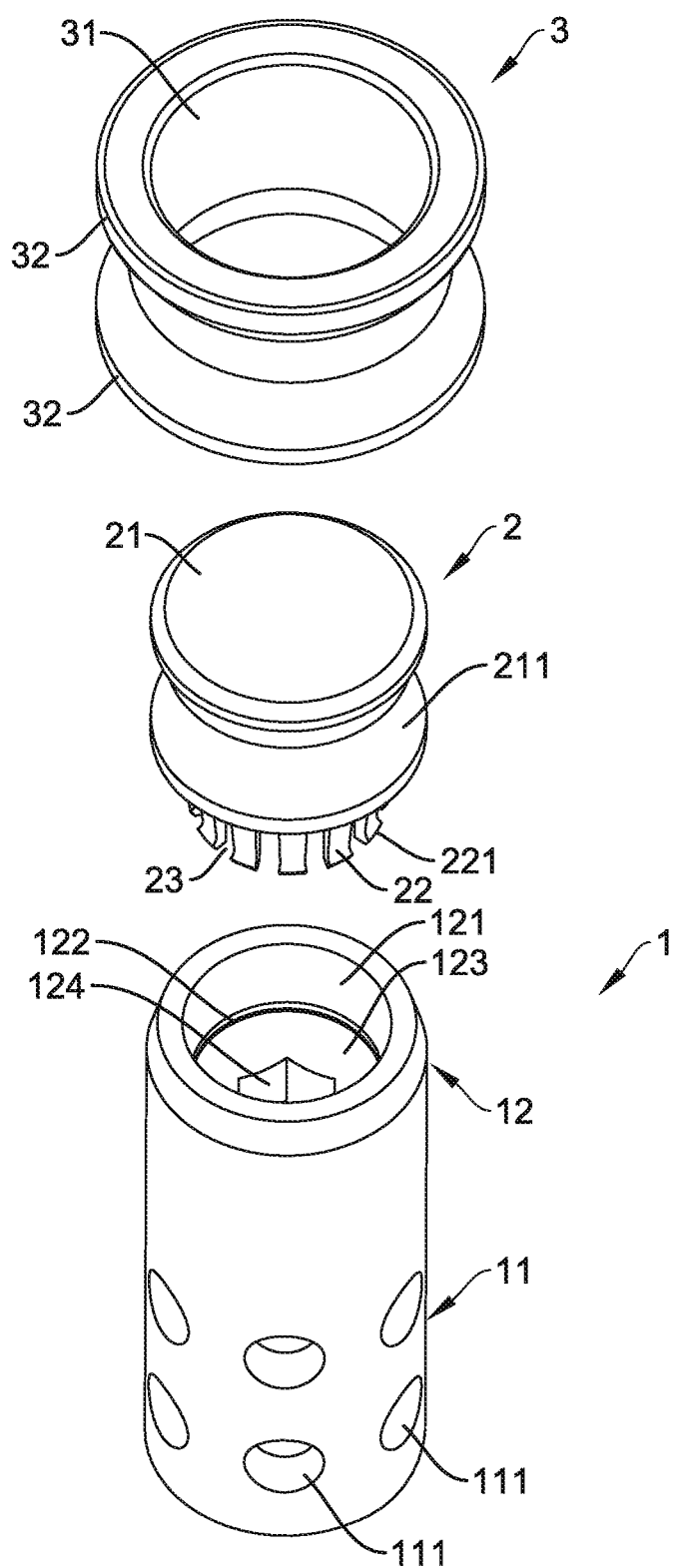
FIG. 1 is an exploded perspective diagram of a dental implant according to a first embodiment of the present disclosure.
Figure 2:
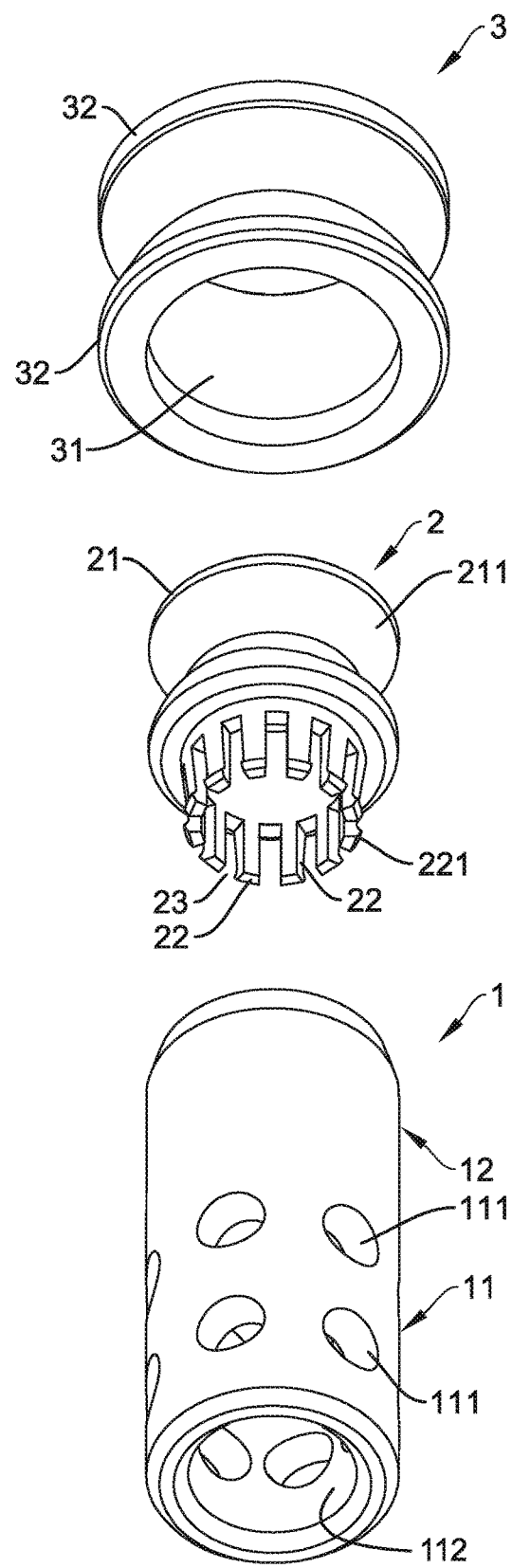
FIG. 2 is an exploded perspective diagram of the dental implant from another angle according to the first embodiment of the present disclosure.
Figure 3:
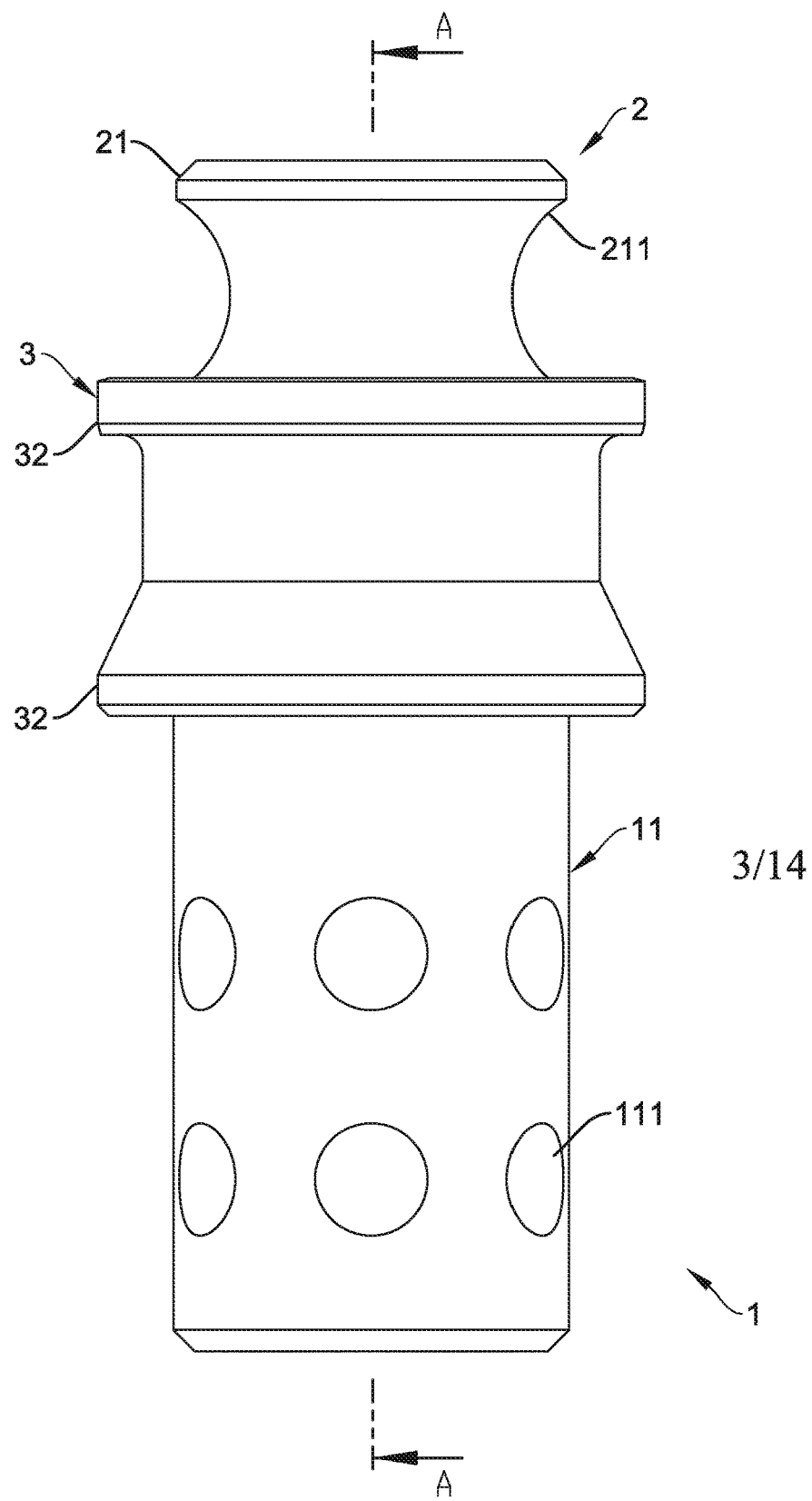
FIG. 3 is a front view of the dental implant according to the first embodiment of the present disclosure.
Figure 4:
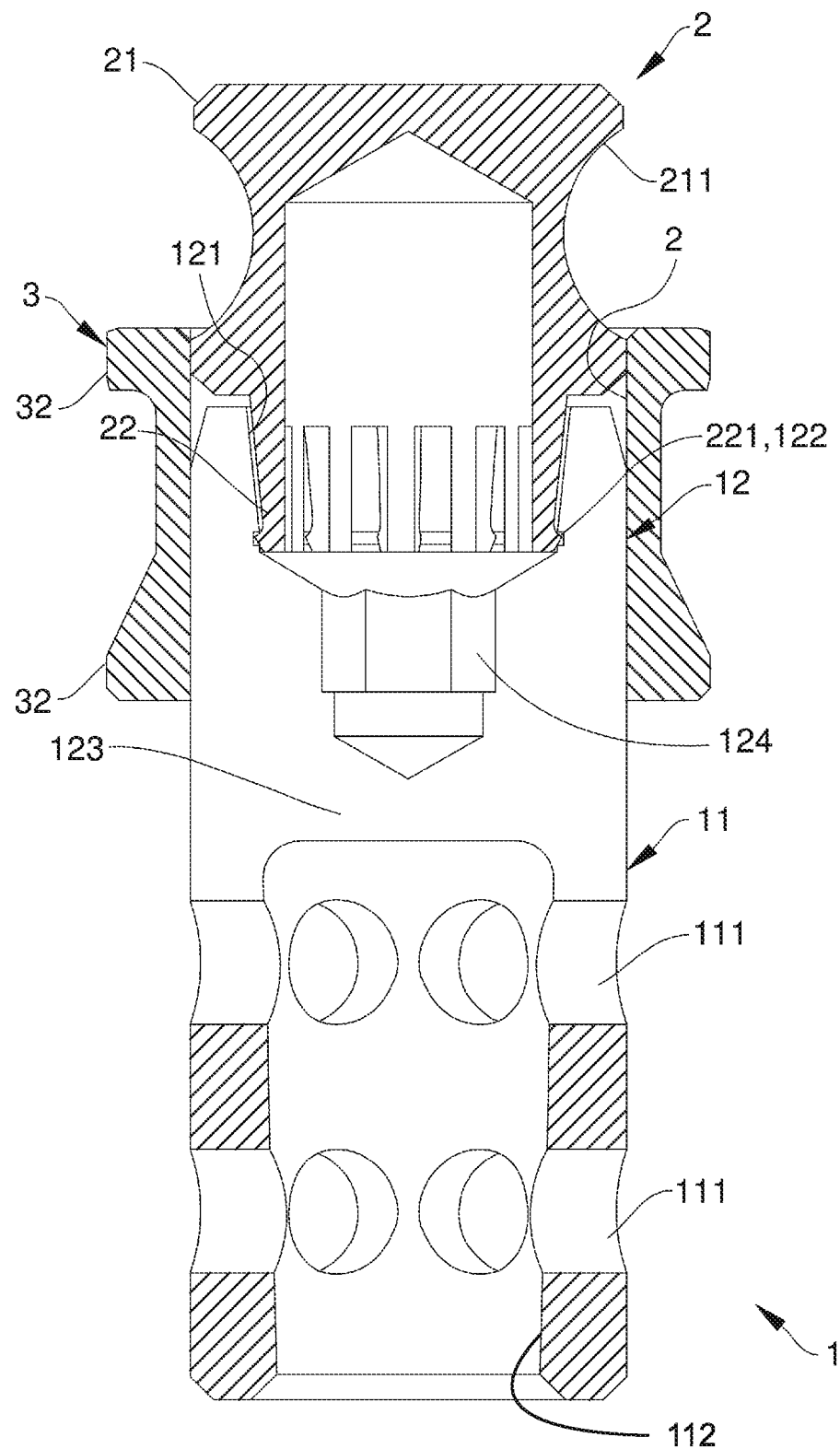
FIG. 4 is a cross-sectional view along the A-A direction of FIG. 3.

Referring to FIG. 1 to FIG. 4, wherein an exploded perspective diagram of a dental implant according to a first embodiment of the present disclosure is shown in FIG. 1, an exploded perspective diagram of the dental implant from another angle according to the first embodiment of the present disclosure is shown in FIG. 2, a front view of the dental implant according to the first embodiment of the present disclosure is shown in FIG. 3, and a cross-sectional view along the A-A direction of FIG. 3. is shown in FIG. 4. In an embodiment, the dental implant of the present disclosure includes a dental root implant 1 forming a columnar body, wherein two ends of the columnar body have a tubular portion 11 and a joint portion 12, respectively. The tubular portion 11 is provided with a plurality of through holes 111, and a central groove 112 is formed inside the tubular portion 11 and communicates with the through holes 111.

Preferably, the dental root implant 1 forms a columnar body, and more preferably, the dental root implant 1 forms a cylindrical body as shown in the figures, thereby forming a tight combination with a drilling hole of the bones and avoiding generation of gaps.

The joint portion 12 may be combined with a dental crown, the tubular portion 11 may be combined with an alveolar bone, and the through holes 111 may promote the osseointegration of the dental root implant 1 and the alveolar bone.

The through holes 111 may be true circular holes, which can facilitate drilling and processing. The through holes 111 may also be a variety of holes, such as using laser cutting technology to make the required hole shape.

In the embodiment, the dental implant of the present disclosure further includes a joint member 2, and the joint member 2 includes a body 21 and a plurality of elastic hooks 22. The elastic hooks 22 are annularly arranged to connect one end of the body 21, a slot 23 is formed between the adjacent elastic hooks 22, and each of the elastic hooks 22 includes a top portion 221 protruding outward. The joint portion 12 is provided with a counterbore 121, an inner wall of the counterbore 121 is provided with a coupling groove 122, and the top portions 221 of the elastic hooks 22 buckle the coupling groove 122.

As shown in this embodiment, the counterbore 121 is combined with other dental implant elements. The joint portion 12 of the dental root implant 1 may also be provided with screw holes or bolts (not shown) to be coupled with other dental implant elements. For example, the joint portion 12 is provided with a screw hole, and a perforation is provided in the dental crown by traditional method. A screw is locked into the screw hole of the joint portion 12 through the perforation, and then the perforation of the dental crown is filled.

In the embodiment, an outer surface of the body 21 is provided with an annular groove 211. When the joint member 2 is disposed in the dental crown, the annular groove 211 may form a locking ring to prevent the joint member 2 from being separated from the dental crown.

In the embodiment, a wall 123 is disposed between the counterbore 121 and the tubular portion 11. The wall 123 may prevent the alveolar bone from entering the counterbore 121 of the joint portion 12.

In the embodiment, the wall 123 is provided with a driving hole 124, wherein the driving hole 124 may be arranged in a hexagonal socket shape as shown in the figure, so as to facilitate the use of a hexagon socket wrench to drive or combine. It can be understood that the driving hole 124 may also form a cross screw hole or a driving hole of other shapes.

In this embodiment, in order to strengthen the bonding strength between the dental root implant 1 and the joint member 2, the dental implant further includes a restraint ring 3, and an outer surface of the dental root implant 1 and an outer surface of the joint member 2 are sleeved with the restraint ring 3. The restraint ring 3 is provided with an annular hole 31. The inner diameter of the annular hole 31 is in a tight fit with the outer diameter of the dental root implant 1 and the joint member 2, so that the restraint ring 3 forms an outer sheath of the dental root implant 1 and the join member 2. Furthermore, it is not easy for the dental root implant 1 and the join member 2 to oscillate and detach in the radial direction.

The outer surface of the restraint ring 3 is provided with at least one flange 32. When the restraint ring 3 is arranged in a dental crown, the flange 32 may form a locking ring to prevent the restraint ring 3 from being separated from the dental crown.

In the embodiment, the preferred number of the elastic hooks 22 is 8 to 16, and it is more preferable to have 12 elastic hooks 22 as shown in the figure, so as to obtain a good fastening strength.

Figure 5:
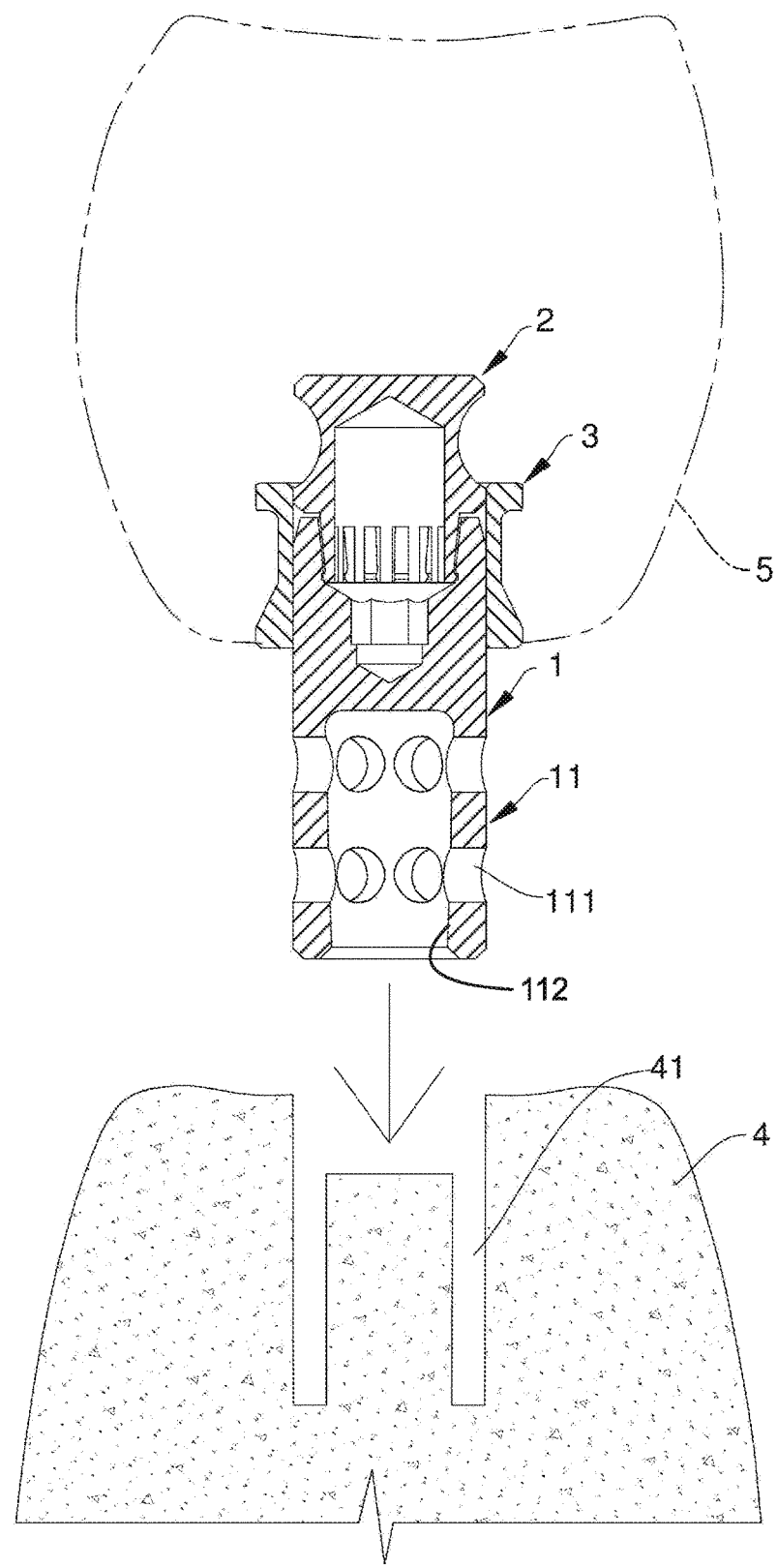
FIG. 5 is a schematic diagram of a coupling process between the dental implant and an alveolar bone according to the first embodiment of the present disclosure.

Please refer to FIG. 5. A schematic diagram of a coupling process between the dental implant and an alveolar bone according to the first embodiment of the present disclosure is illustrated. In the embodiment, the joint member 2 and the restraint ring 3 are combined with the dental crown 5 to form a single dental implant. The dental root implant 1 of the present disclosure can be connected to the joint member 2 by a buckle connection. The single dental implant formed by the dental root implant 1 and the joint member 2, the restraint ring 3 and the dental crown 5 may be combined or separated.

During the operation, a circular resection is performed on an alveolar bone 4, and an annular hole 41 is formed in the alveolar bone 4. Then, the tubular portion 11 of the root implant 1 may be inserted into the annular hole 41.

Figure 6:
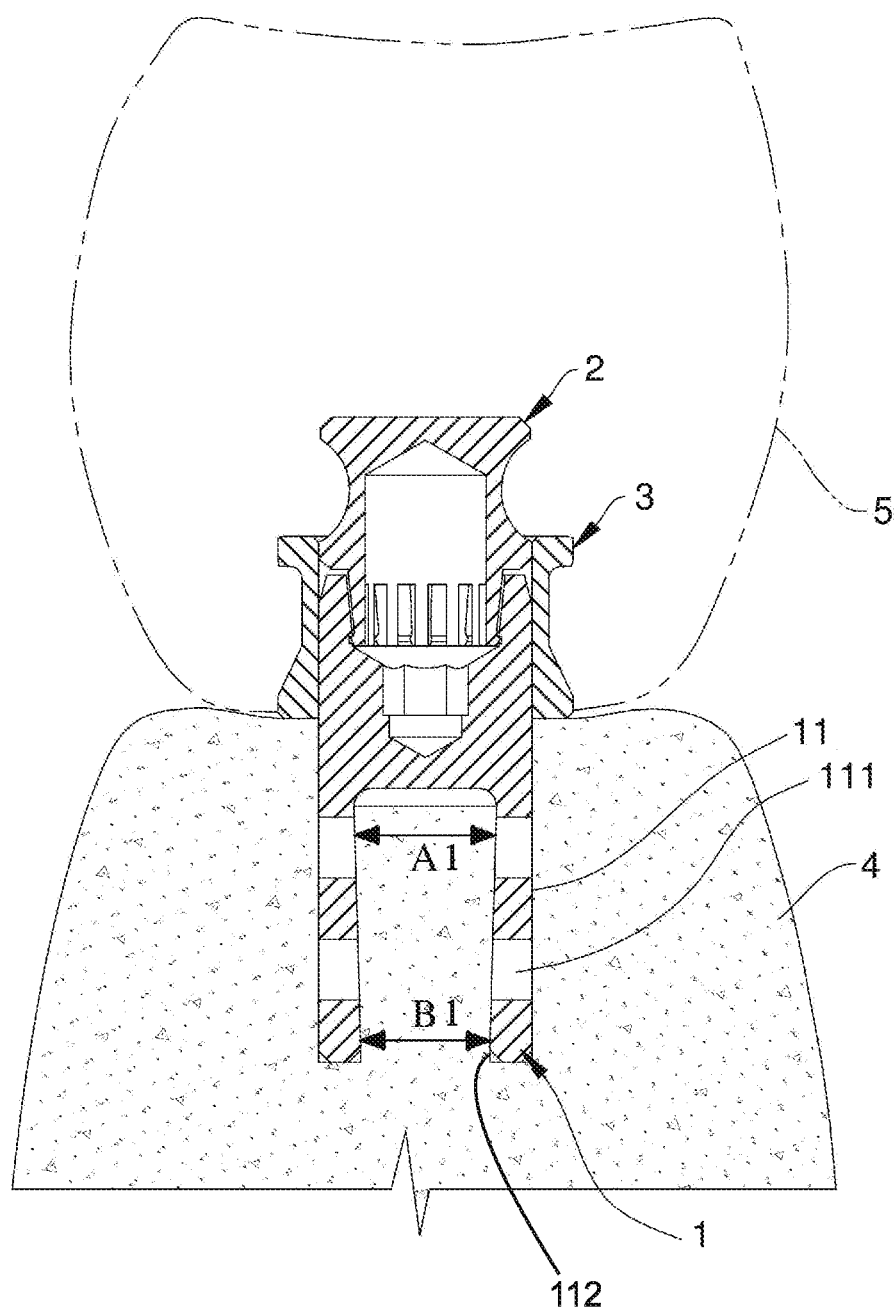
FIG. 6 is a schematic diagram of the dental implant being integrated with the alveolar bone according to the first embodiment of the present disclosure.

Refer to FIG. 6. A schematic diagram of the dental implant being integrated with the alveolar bone according to the first embodiment of the present disclosure is illustrated. Compared with the bolt-type implant of the prior art, when the dental root implant 1 of the present disclosure is implanted in the annular hole 41 of the alveolar bone 4, a tinier gap between the dental root implant 1 and the annular hole 41 makes food residues or bacteria difficultly invade the gap, and thus avoids various diseases, such as periodontal disease in the future. In addition, an inner diameter of the central groove 112 gradually shrinks in a direction from a place close to the joint portion 12 to a place away from the joint portion 12. For example, in the central groove 112, an inner diameter A1 close to the joint portion 12 is greater than an inner diameter B1 far from the joint portion 12. In the process of cutting the alveolar bone with the trephine, through the reverse taper design of the central groove 112, the debris of the alveolar bone may enter from the bottom of the central groove 112, facilitating the debris moving towards an upper part of the central groove 112 and discharged from the through holes 111. Thus, it is possible to reduce the process of cooperating with additional drilling equipment, and improve the stability of drilling, so as to achieve the smallest bone defect during the operation and reduce bone loss.

Figure 7:
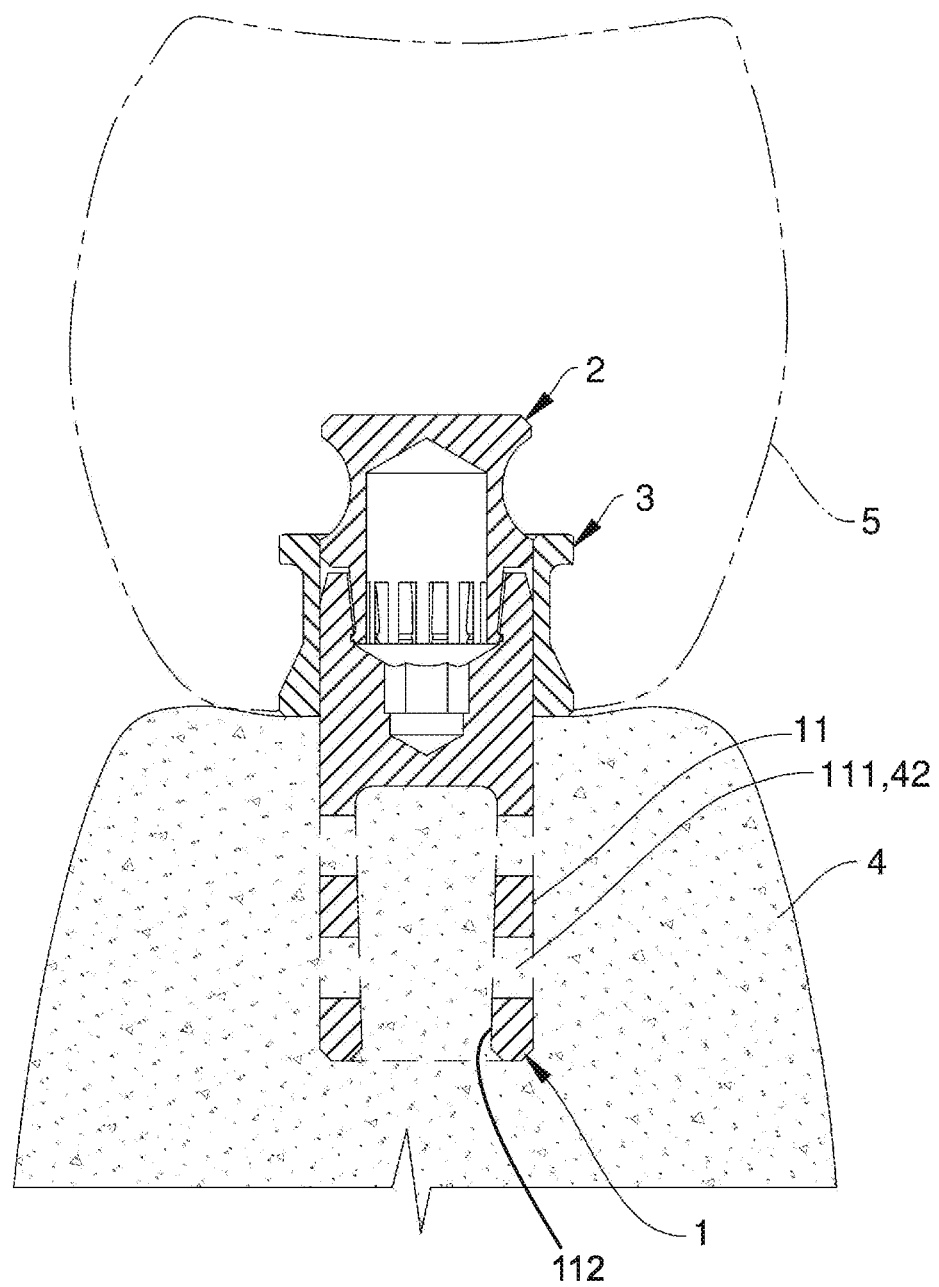
FIG. 7 is a schematic diagram of osseointegration after the dental implant is combined with the alveolar bone according to the first embodiment of the present disclosure.

Refer to FIG. 7, a schematic diagram of osseointegration after the dental implant is combined with the alveolar bone according to the first embodiment of the present disclosure is illustrated. When the dental implant surgery is completed for a period of time, the alveolar bone 4 and the dental root implant 1 undergo osseointegration. The hyperplastic bone 42 of the alveolar bone 4 will grow into the through hole 111 so that the alveolar bone 4 and the dental root implant 1 are integrated. The top surface of the dental root implant 1 in contact with the alveolar bone 4 is tightly connected in a circular ring shape, which can reduce the occurrence of periodontal disease.

Figure 8:
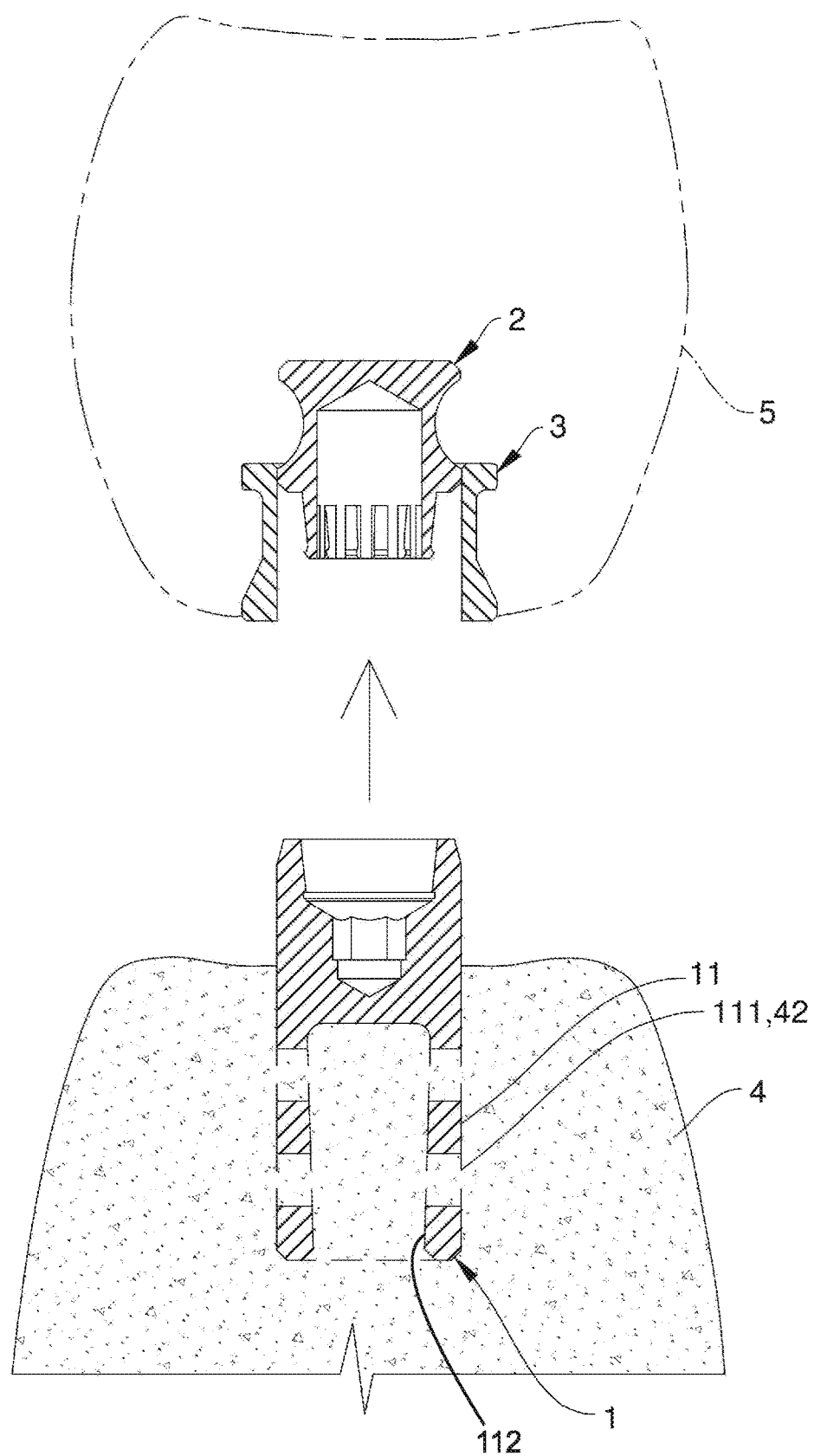
FIG. 8 is a schematic diagram of a dental crown detached from the dental root implant.

Refer to FIG. 8, a schematic diagram of a dental crown detached from the dental root implant is illustrated. In one embodiment of the present disclosure, the joint member 2, the restraint ring 3 and the dental crown 5 are combined to form a single dental implant, wherein the dental root implant 1 and the joint member 2 are combined in a movable buckling manner, so that the single dental implant may be separated from the dental root implant 1, which is convenient for cleaning, repairing, or replacing.

When the single dental implant formed by the combination of the joint member 2, the restraint ring 3, and the dental crown 5 is buckled with the dental root implant 1, the elastic hooks 22 and the coupling grooves 122 have excellent coupling strength and withstand a pulling force of about 20 kg. It has excellent tensile strength during normal eating and prevent dental implant from falling off.

As described above, the dental root implant 1 of the present disclosed is provided with a tubular portion 11 and a joint portion 12, and the tubular portion 11 may be tightly joined with an alveolar bone 4. The joint portion 12 may be combined with the dental crown 5 in various ways, which can improve the shortcomings of conventional bolt-type implants and increase the success rate of dental implant.

Figure 9:
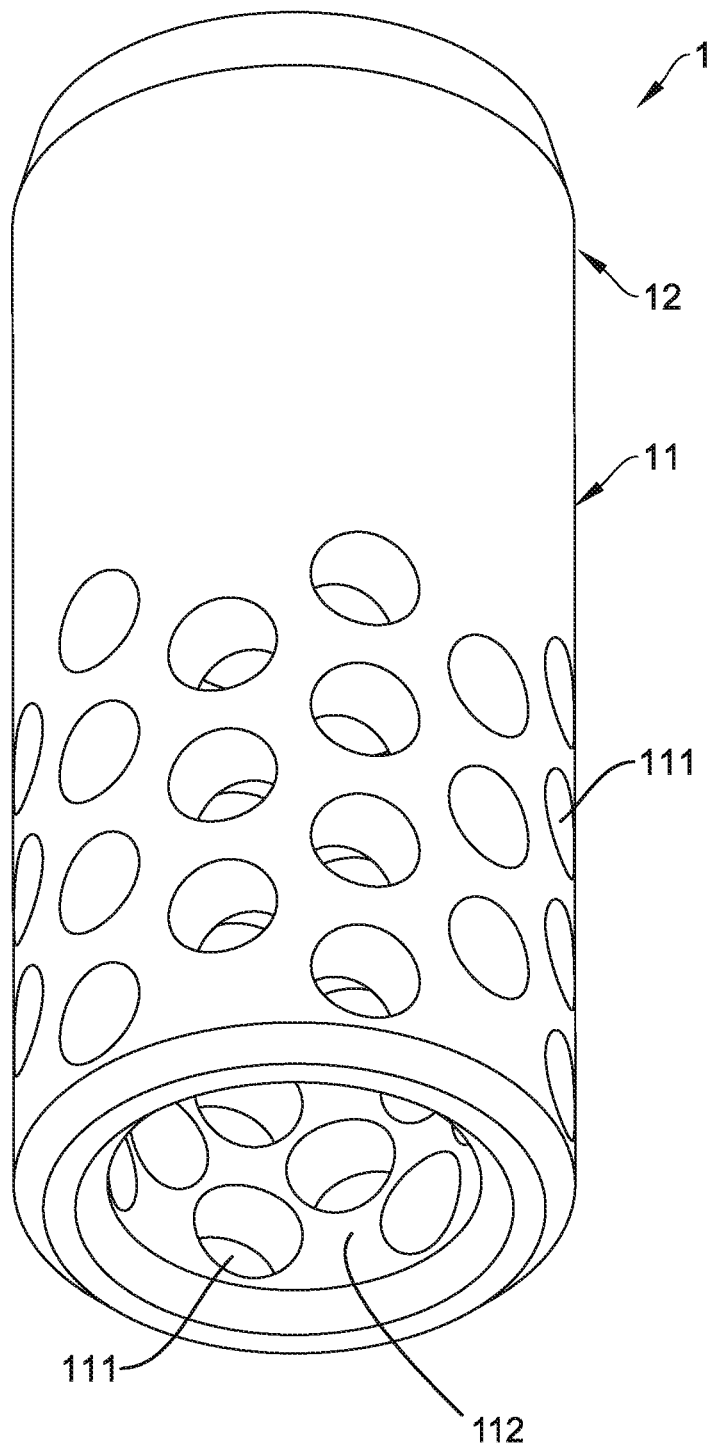
FIG. 9 is a perspective diagram of a dental root implant according to a second embodiment of the present disclosure.

Refer to FIG. 9. A perspective diagram of a dental root implant according to a second embodiment of the present disclosure is illustrated. The difference from the previous embodiment is that the number and size of the through holes 111 are different. It is understandable that the number and size of the through holes 111 provided in the dental root implant 1 of the present disclosure may be adjusted according to the bone quality of the patient or various factors. The shape of the through holes 111 may also be changed according to requirements.

Figure 10:
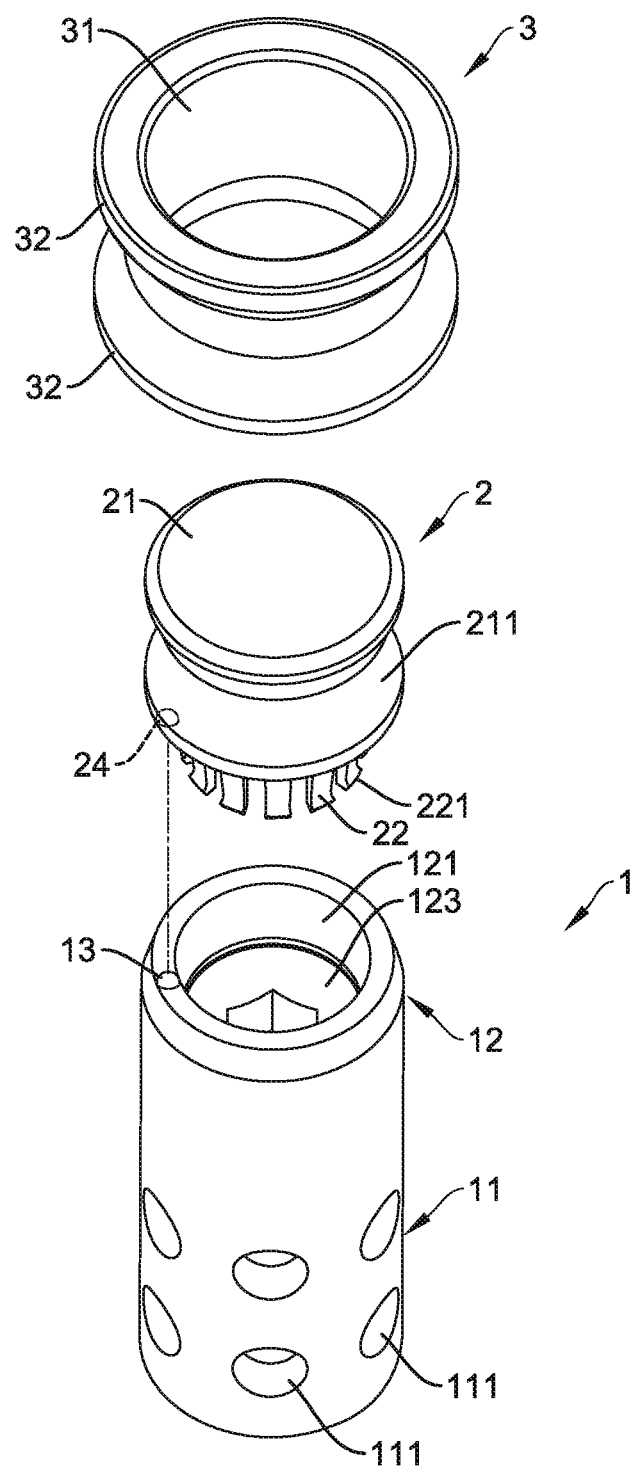
FIG. 10 is an exploded perspective diagram of a dental implant according to a third embodiment of the present disclosure.

Refer to FIG. 10, an exploded perspective diagram of a dental implant according to a third embodiment of the present disclosure is illustrated. In order to prevent the dental implant from rotating arbitrarily, anti-rotation measures may be added between the opposed elements. In the embodiment, a protrusion 13 is provided on the dental root implant 1, and the joint member 2 is provided with a concave hole 24 corresponding to the position of the protrusion 13, so as to prevent the joint member 2 from rotating freely relative to the dental root implant 1.

Figure 11:
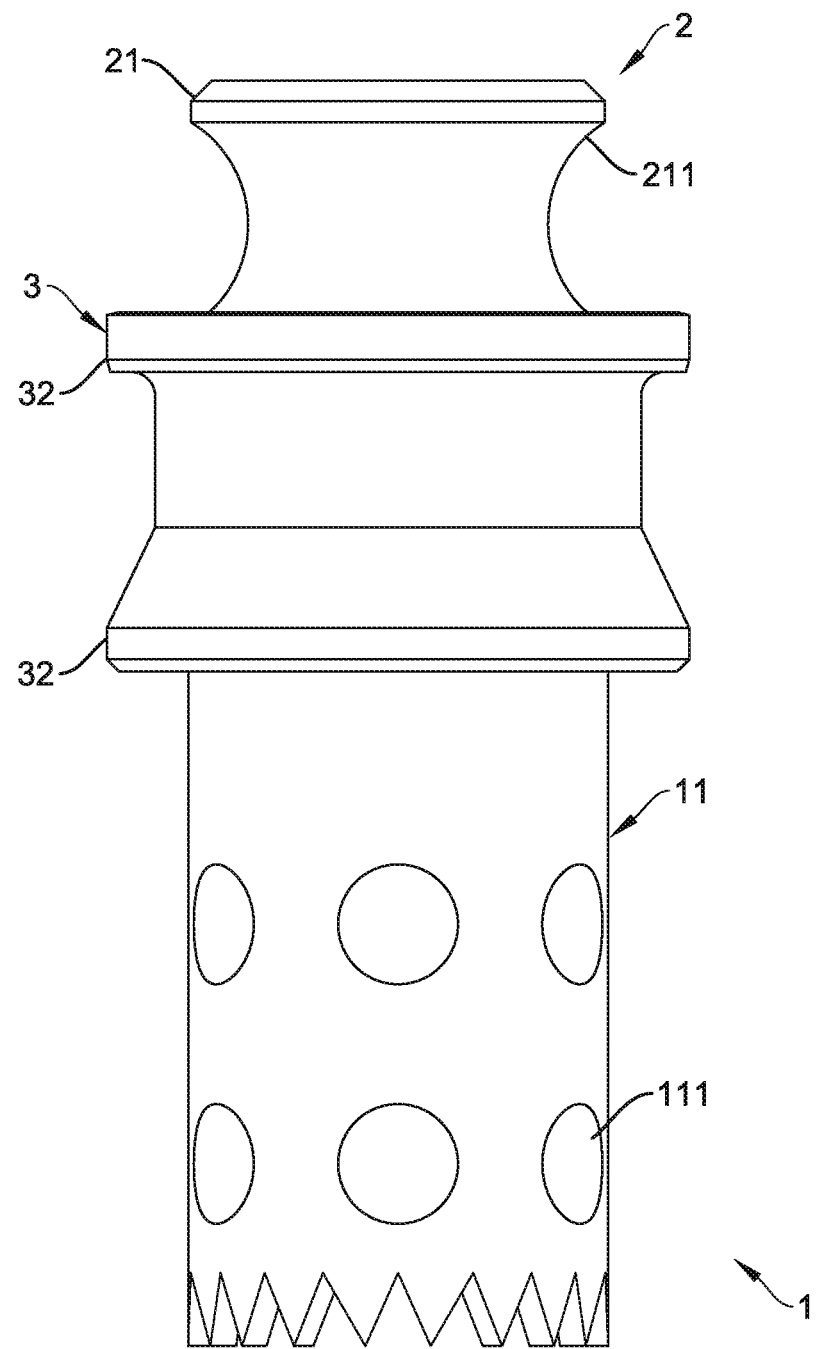
FIG. 11 is a front view of a dental implant according to a fourth embodiment of the present disclosure.

Refer to FIG. 11, a front view of a dental implant according to a fourth embodiment of the present disclosure is illustrated. In order to prevent the dental implant from rotating arbitrarily, an anti-rotation method can be directly added to the component. In the embodiment, the bottom end of the tubular portion 11 is formed in a non-flat zigzag shape, so that the dental root implant 1 may have the function of truncating alveolar bone. No additional drilling equipment is required before implanting the dental root implant 1. It may achieve the smallest bone defect in the operation, improve the stability, and also make the dental root implant 1 and the bone mosaic growth.

Figure 12:
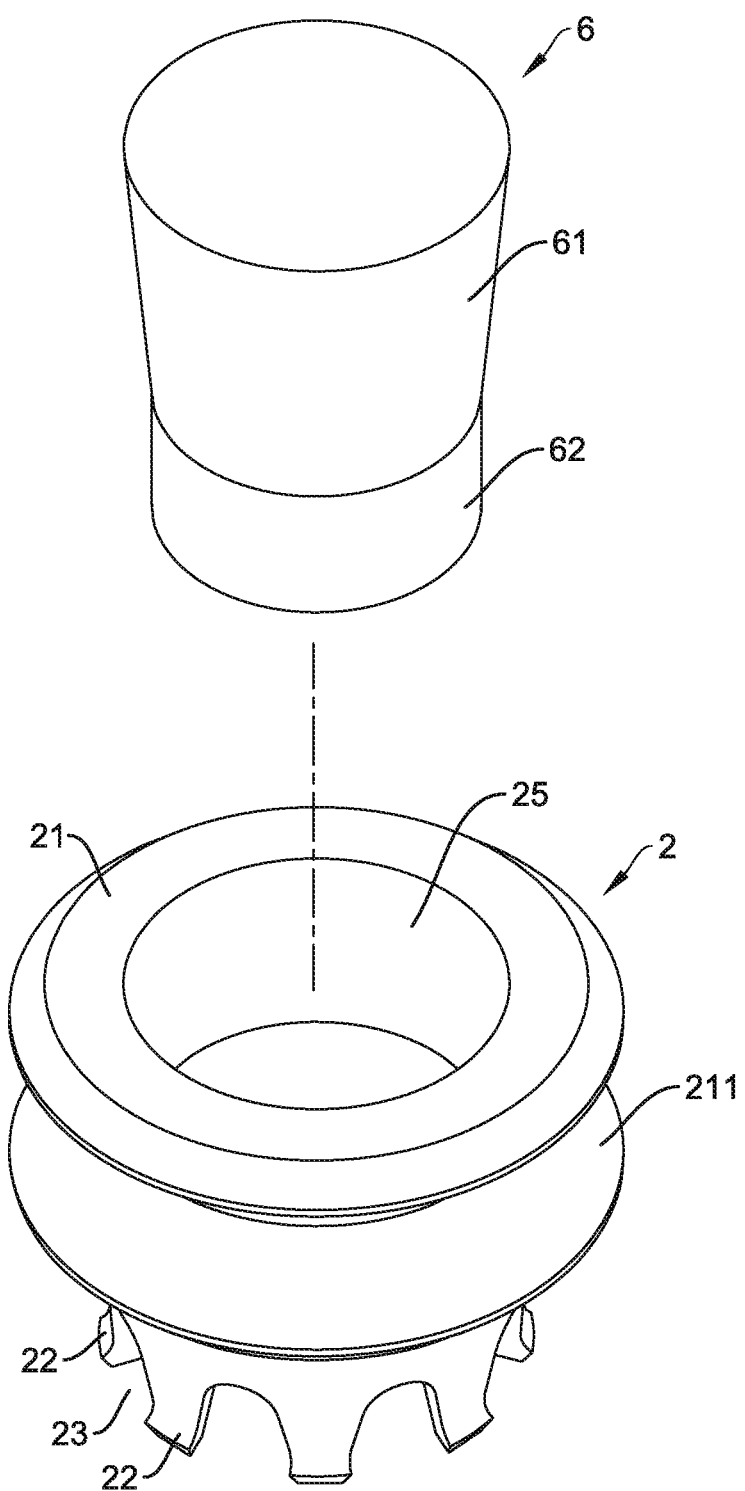
FIG. 12 is an exploded perspective view of a dental implant according to a fifth embodiment of the present disclosure.
Figure 13:
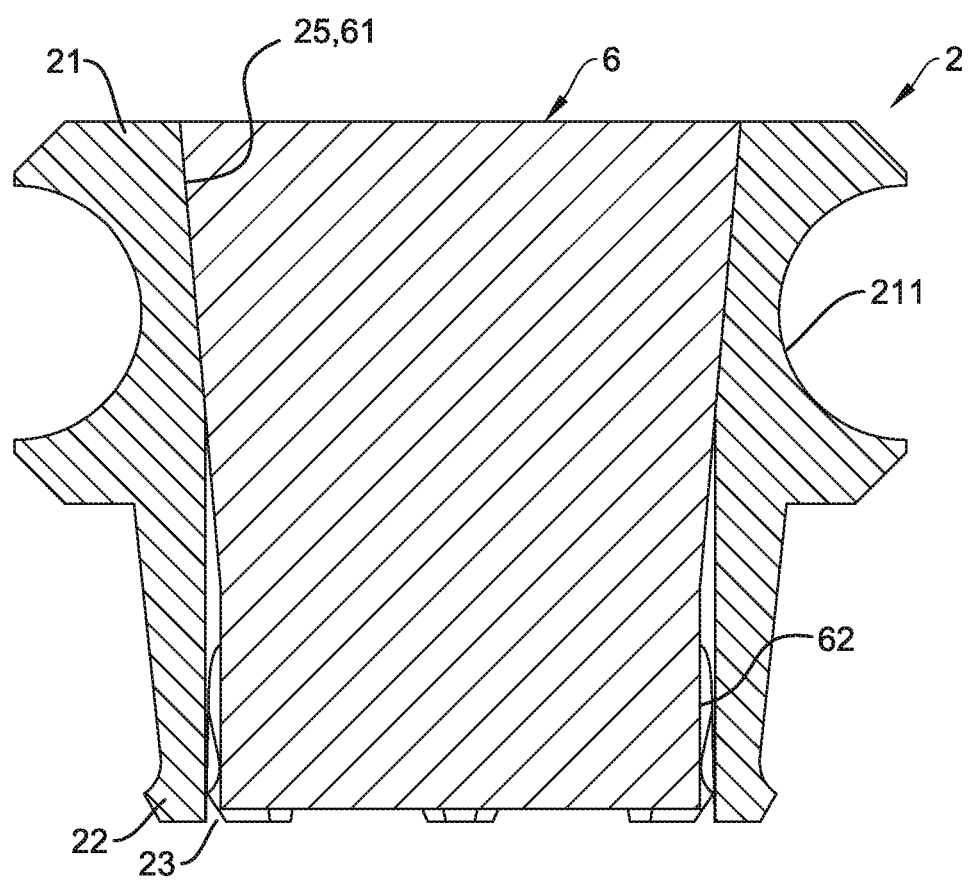
FIG. 13 is a cross-sectional view of the dental implant according to the fifth embodiment of the present disclosure.
Figure 14:
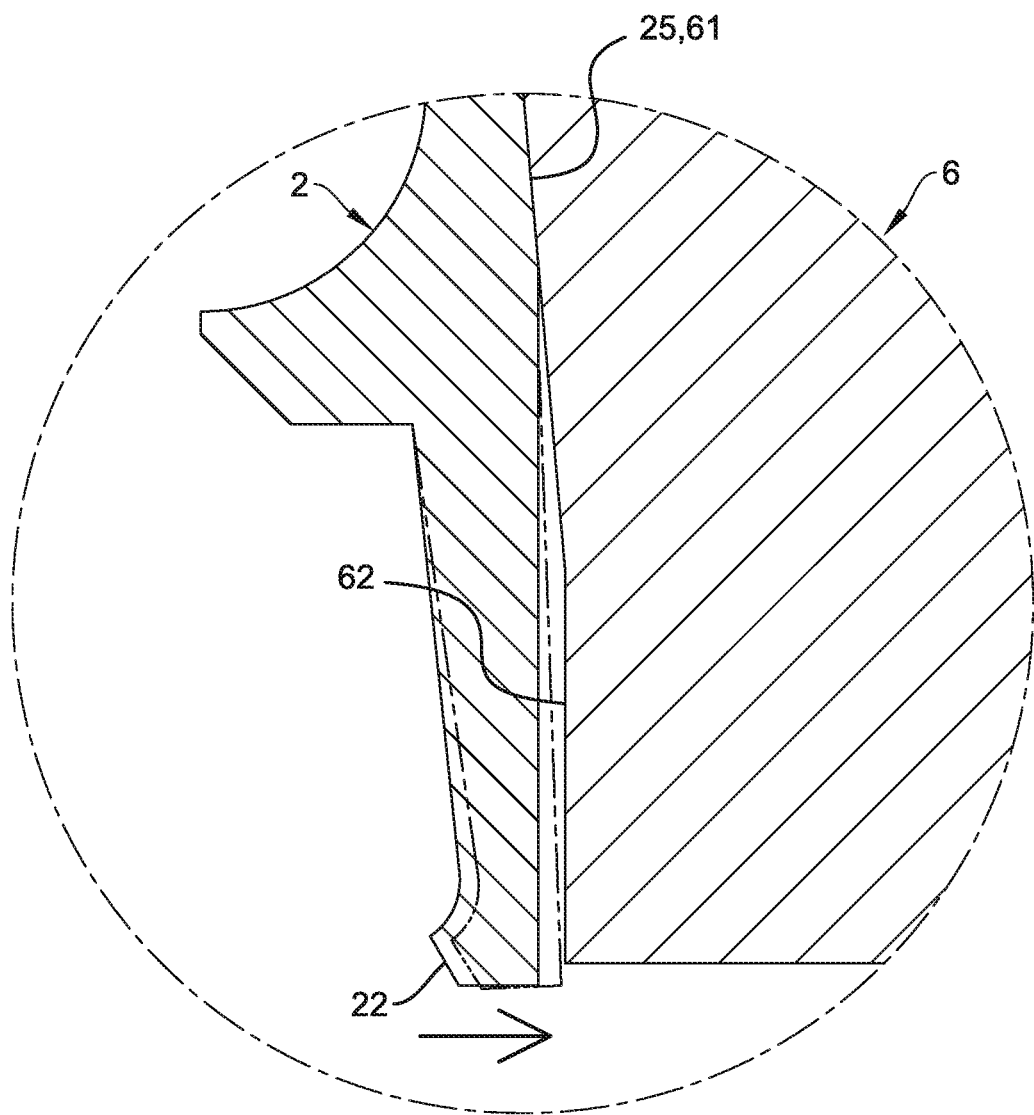
FIG. 14 is a partial view of the dental implant according to the fifth embodiment of the present disclosure.

Refer to FIG. 12, FIG. 13, and FIG. 14. An exploded perspective view of a dental implant according to a fifth embodiment of the present disclosure, a cross-sectional view of the dental implant according to the fifth embodiment of the present disclosure, and a partial view of the dental implant according to the fifth embodiment of the present disclosure are illustrated. The elastic hooks 22 of the joint member 2 may cause material fatigue after years of use. As a result, the rigidity of the elastic hooks 22 is reduced, and the top portion 221 of the elastic hooks 22 may accidentally escape from the coupling groove 122 during chewing and the dental implant may fall off. In order to prevent this situation, in this embodiment, a through hole 25 is provided in the joint member 2, and the dental implant further includes a supporting member 6. The support member 6 is arranged in the through hole 25 to resist the retreating elastic hooks 22

Preferably, in the embodiment, the dental implant further includes a supporting member 6. The support member 6 has a filling portion 61 and a stopping portion 62, wherein the joint member is provided with a through hole 25. The filling portion 61 is coupled to the through hole 25, and the stopping portion 62 is located inside the elastic hooks 22.

The filling portion 61 and the through hole 25 preferably have a push-pull taper fit, but are not limited to this.

More preferably, there is a gap (not labeled) between the stopping portion 62 and each of the elastic hooks 22. During the process of installing the dental implant, there is still a proper deformation space for the elastic hooks 22 to elastically deform, and the stopping portion 62 is supported on the inner side of the elastic hooks 22. When the amount of deformation of the elastic hooks 22 exceeds the gap, the stopping portion 62 may withstand the elastic hooks 22 without retreating, thereby preventing the dental implant from accidentally detaching.

The present disclosure has been described with preferred embodiments thereof and it is understood that many changes and modifications to the described embodiments can be carried out without departing from the scope and the spirit of the invention that is intended to be limited only by the appended claims.

What is claimed is:

1. A dental implant, comprising:
   a dental root implant forming a columnar body, wherein the columnar body have a tubular portion and a joint portion;
   wherein the tubular portion is provided with a plurality of through holes, a central groove is formed inside the tubular portion and communicates with the through holes, and an inner diameter of the central groove tapers from approaching the joint portion to away from the joint portion;
   wherein the dental implant further comprises a restraint ring and a joint member, and an outer surface of the dental root implant and an outer surface of the joint member are sleeved with the restraint ring.

2. The dental implant according to claim 1, wherein the joint member includes a body and a plurality of elastic hooks;
   the elastic hooks are annularly arranged to connect one end of the body, a slot is formed between the adjacent elastic hooks, and each of the elastic hooks includes a top portion protruding outward; the joint portion is provided with a counterbore, an inner wall of the counterbore is provided with a coupling groove, and the top portions of the elastic hooks buckle the coupling groove.

3. The dental implant according to claim 2, wherein a wall is disposed between the counterbore and the tubular portion.

4. The dental implant according to claim 3, wherein the wall is provided with a driving hole.

5. The dental implant according to claim 2, wherein an outer surface of the body is provided with an annular groove.

6. The dental implant according to claim 2, wherein the dental root implant is provided with a protrusion, and the joint member is provided with a concave hole corresponding to the protrusion.

7. The dental implant according to claim 2, wherein the dental implant further includes a supporting member including a filling portion and a stopping portion, the joint member is provided with a through hole, the filling portion is coupled to the through hole, and the stopping portion is located inside the elastic hooks.

8. The dental implant according to claim 7, wherein a gap is formed between the stopping portion and each of the elastic hooks.

9. The dental implant according to claim 1, wherein an outer surface of the restraint ring is provided with at least one flange.

* * * * *